March 22, 1927.
C. L. PAULUS ET AL
1,622,205
FUSELAGE FOR AIRCRAFT
Filed Feb. 1, 1926
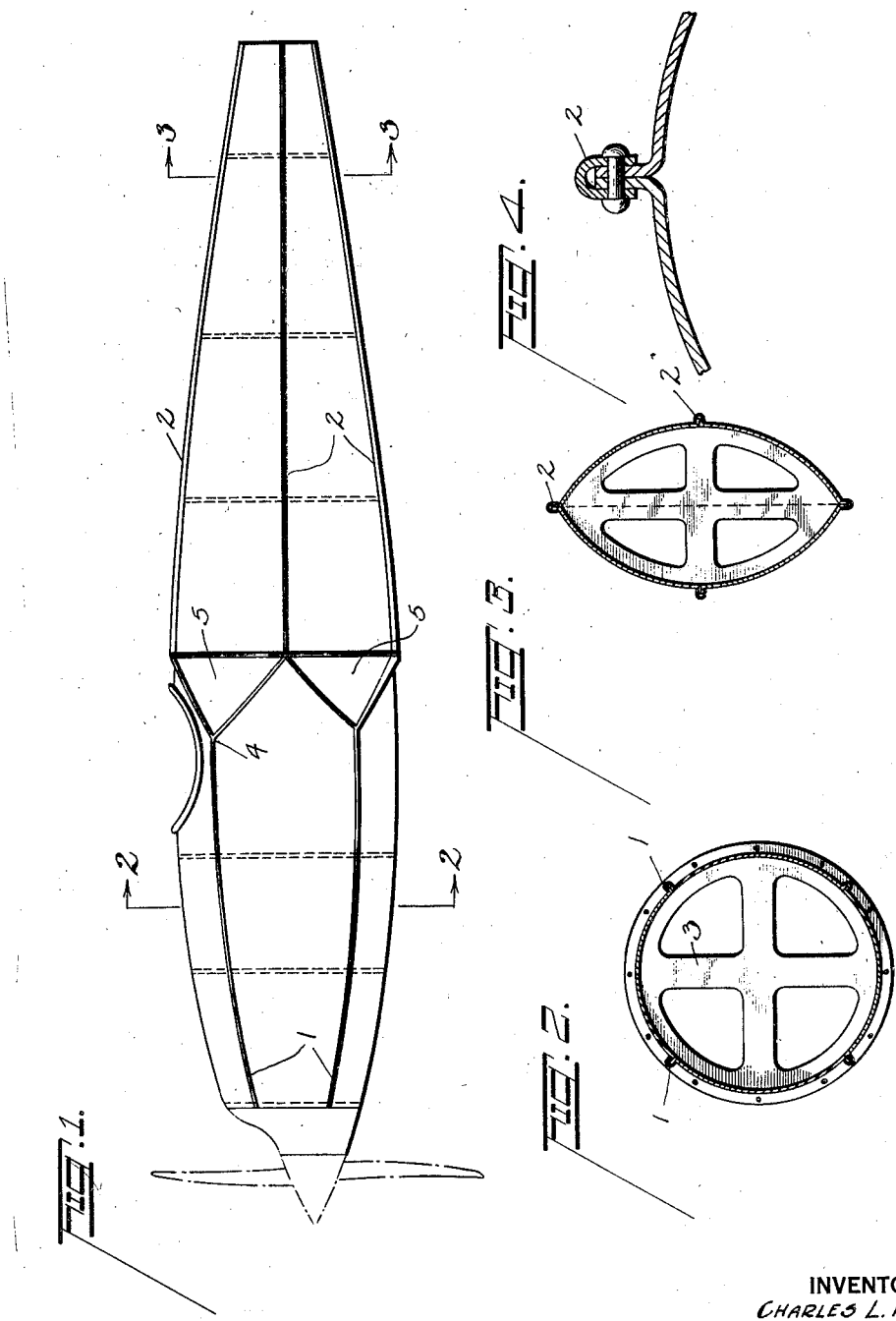
INVENTORS
CHARLES L. PAULUS
ROBERT KAUCH
BY
*Robert H. Young*
ATTORNEY Patented Mar. 22, 1927.

1,622,205

UNITED STATES PATENT OFFICE.

CHARLES L. PAULUS, OF DAYTON, OHIO, AND ROBERT KAUCH, OF THE UNITED STATES ARMY, CAMP NICHOLS, PHILIPPINE ISLANDS.

FUSELAGE FOR AIRCRAFT.

Application filed February 1, 1926. Serial No. 85,407.

This invention relates to the mode of constructing the fuselage of an airplane and particularly to the placing of the rigid longitudinal members.

The object of the invention resides partly in the particular plan of constructing the rigid longitudinal members of a fuselage which correspond to the longérons in other types of fuselages. In our construction said longitudinal members are placed on the periphery of the fuselage in the front, at diagonal points and between the horizontal and vertical planes thereof and in the rear at a point where such planes cut the periphery of the fuselage.

A further object is to provide connecting means for these longitudinal members or to connect them directly in such a way as to permit the easy disconnecting of the fuselage at its middle portion.

Another object is to provide a construction wherein a plurality of similarly shaped sheet metal panels are employed thereby permitting high and cheap production.

Still another object is to provide a construction wherein the fuselage may be assembled from the exterior.

Other objects will appear from the description and drawings attached hereto in which:

Fig. 1 is a side view of the proposed construction.

Fig. 2 is an enlarged sectional view through the fuselage at a point directly ahead of the cockpit on line 2—2 of Fig. 1.

Fig. 3 is an enlarged sectional view of the rear portion of the fuselage on line 3—3 of Fig. 1.

Fig. 4 is a detail view showing the method of joining the various members together.

Referring more particularly to the drawings, it will be noted that the rigid members 1 are positioned at diagonal points on the fuselage. That is they are between the points where a horizontal and a vertical plane cuts the fuselage. They may be constructed of metal piping or tubes or may be the bead formed by the junction of the longitudinal plates of the fuselage. This arrangement permits the strength obtained from these members at the front of the fuselage to be utilized for mounting the wings, landing gear, and engine base and eliminates the necessity of fracturing or interrupting the upper members in placing the cockpit opening. Strengthening members 2 in the rear portion of the fuselage are mounted where a horizontal and a vertical plane cuts the periphery of the fuselage which arrangement separates the members in the direction of the force applied by the tail surface and tail skid, and is advantageous in that it permits the various units of the tail group such as the fin and elevators to be mounted directly upon said strengthening members.

The front and rear rigid members are joined together at 4, a single front member being joined to two of the rear ones. This junction is effected by a triangular metal plate 5, or by a triangular frame, or the rigid members themselves may be extended. As stated above the rigidity necessary may be derived from the bead formed by the longitudinal junction of metal plates when the same are used as a covering for the fuselage. In this case, the plates themselves are so formed that they may be directly joined together at the medial line of the fuselage. The point, in joining in any manner the front portion to the rear, is to so join them that the rigidity will be continuous from front to rear.

As stated in the introduction of this application, one of the objects of this invention is to provide a construction wherein the longérons for the rear part of the fuselage are in a horizontal and vertical position beyond the cockpit and on the diagonal line in front thereof. If the frame is built up from tubing or the like, as these longérons, the front ones may terminate in an upturned flange as shown in Fig. 4. The rear ones terminate in a triangular apex 4 which may be welded together in a similar upturned flange and joined to the upturned flange of the front members as shown in Fig. 4. Again, the front longérons may be provided with yoke extensions and joined, as described, to the rear members at horizontal and vertical points.

Vertical bulkheads are distributed throughout the fuselage to maintain the longérons in place. These bulkheads may be integral with the longérons or joined thereto in some convenient manner.

It is thus evident, that this construction permits of the exterior assembly of the frame or fuselage and provides means for exteriorly disconnecting the front from the rear portion.

It is evident from the foregoing description that the entire fuselage may be constructed from eight strips of sheet metal, four of which are alike for the front section, and the remaining four alike for the rear section.

In the construction where the rigid members constitute a frame, they may, of course, be covered with either the metal plates or with canvas.

Having thus fully described our invention, what we claim as new is:

1. In an aircraft, a fuselage comprising a front section and a rear section, longitudinal brace members for the front section spaced diagonally on the periphery of the fuselage and between the horizontal and vertical axial planes thereof, longitudinal brace members for the rear section of the fuselage spaced on the periphery of the fuselage and on the horizontal and vertical axial planes thereof, and means connecting the members of the front section to the members of the rear section.

2. In an aircraft, a fuselage comprising a front section and a rear section, longitudinal brace members for the front section, spaced diagonally on the periphery of the fuselage and between the horizontal and vertical axial planes thereof, longitudinal brace members for the rear section of the fuselage spaced on the periphery of the fuselage and on the horizontal and vertical axial planes thereof, a vertical connecting plate and inter-connecting members carried by said plate.

3. In an aircraft, a fuselage comprising a front section and a rear section, longitudinal bracing members for the front section spaced diagonally on the periphery of the fuselage and between the horizontal and vertical axial planes thereof, similar bracing members for the rear section of the fuselage spaced on the periphery thereof and on the horizontal and vertical axial planes, and triangular shaped connecting plates for connecting said bracing members together.

4. In an aircraft, a fuselage comprising a front section and a rear section, longitudinal bracing members for the front section spaced diagonally on the periphery of the fuselage and between the horizontal and vertical axial planes thereof, similar bracing members for the rear section of the fuselage spaced on the periphery thereof and on the horizontal and vertical axial planes and triangular shaped connecting plates for connecting said bracing members together in such a way that a single front member is connected to two of the rear members.

5. In an aircraft, a fuselage comprising a front section and a rear section, longitudinal bracing members for the front section spaced diagonally on the periphery of the fuselage and between the horizontal and vertical axial planes thereof, similar bracing members for the rear section of the fuselage spaced on the periphery thereof and on the horizontal and vertical axial planes, and triangular shaped connecting plates for connecting said bracing members together in such a way that the longitudinal stresses are continuous from the front bracing members to the rear.

6. In an aircraft, a fuselage comprising front and rear sections each of said sections being formed from four similarly shaped plates, the plates of the front section being formed together longitudinally at diagonal points between the horizontal and vertical axial planes of the fuselage, and the plates of the rear section being joined on the horizontal and vertical axial planes, means for absorbing longitudinal stresses at the point of junction and means for connecting the front plates to the rear ones in such a manner that the stresses are absorbed along a continuous line.

7. In an aircraft, a fuselage comprising front and rear sections each of said sections being formed from four similarly shaped plates, rigid members for absorbing longitudinal stresses, the members for the front section extending longitudinally at diagonal points between the horizontal and vertical axial planes of the fuselage and on said axial planes in the rear section and means for connecting the front rigid members to the rear ones.

8. In an aircraft, a fuselage comprising front and rear sections each of said sections being formed from four similarly shaped plates, rigid members for absorbing longitudinal stresses, the members for the front section extending longitudinally at diagonal points between the horizontal and vertical axial planes of the fuselage and on said axial planes in the rear section, means for connecting the front rigid members to the rear ones, and means whereby the entire assembly may be performed from the exterior.

9. In an aircraft, a fuselage comprising front and rear sections each of said sections being formed from four similarly shaped plates, rigid members for absorbing longitudinal stresses, the members for the front section extending longitudinally at diagonal points between the horizontal and vertical axial planes of the fuselage and on said axial planes in the rear section, means for connecting the front rigid members to the rear ones, and means whereby the front section may be easily disassembled from the rear section.

In testimony whereof we affix our signatures.

CHARLES L. PAULUS.
ROBERT KAUCH.